July 15, 1952     O. O. PERKINS     2,603,527
SPARE TIRE CARRIER FOR VEHICLES

Filed July 27, 1950     2 SHEETS—SHEET 1

Orville O. Perkins
INVENTOR.

BY *Clarence A. O'Brien*
*and Harvey B. Jackson*
Attorneys

July 15, 1952           O. O. PERKINS           2,603,527

SPARE TIRE CARRIER FOR VEHICLES

Filed July 27, 1950           2 SHEETS—SHEET 2

Orville O. Perkins
INVENTOR.

Patented July 15, 1952

2,603,527

UNITED STATES PATENT OFFICE 2,603,527

SPARE TIRE CARRIER FOR VEHICLES

Orville O. Perkins, Richmond, Va.

Application July 27, 1950, Serial No. 176,197

1 Claim. (Cl. 296—37.2)

This invention relates to new and useful improvements and structural refinements in spare tire carriers for vehicles such as trucks, buses, automobiles, etc., and the principal object of the invention is to afford means for conveniently moving a heavy spare tire and wheel in and out of its storage position.

The above object is achieved by the provision of a spare tire receiving compartment in the body of the vehicle, together with rollers in the compartment to slidably engage and support the tire.

An important feature of the invention resides in the provision of a cover or door on the compartment for closing the same as well as for firmly retaining the tire in position therein.

Some of the advantages of the invention lie in its simplicity of construction, in its efficient operation, and in its adaptability for use in vehicles of different types.

With the above more important objects and features in view and such other objects and features as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
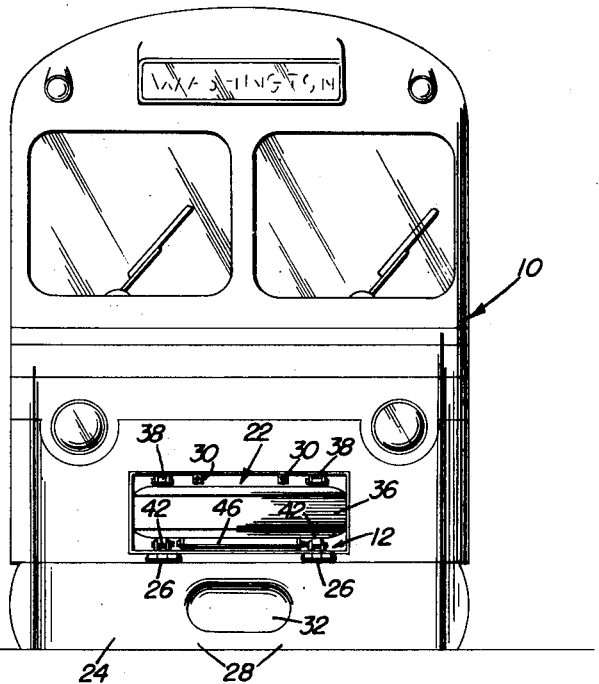
Figure 1 is a front elevational view of a vehicle equipped with the invention, the combined bumper and compartment door being in its open position.
Figure 2:
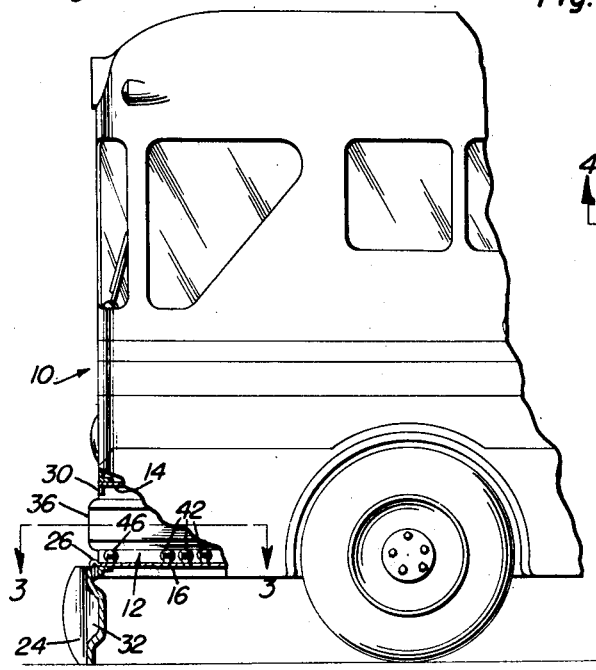
Figure 2 is a fragmentary side elevational view of the subject shown in Figure 1, this being partially broken away so as to reveal its construction.
Figure 3:
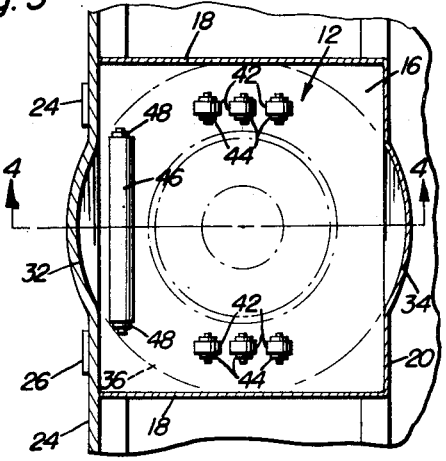
Figure 3 is a fragmentary sectional view in a horizontal plane, taken substantially in the plane of the line 3—3 in Figure 2.
Figure 4:
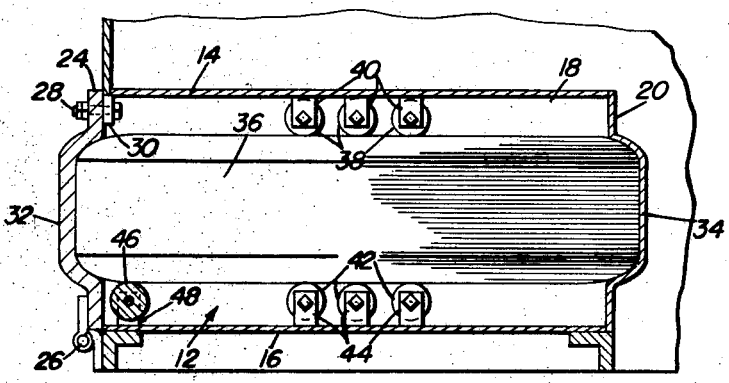
Figure 4 is a fragmentary vertical sectional view, taken substantially in the plane of the line 4—4 in Figure 3.

Referring now to the accompanying drawings in detail, more particularly to Figures 1–4 inclusive, the general reference character 10 designates the body of a vehicle such as a bus, the same being provided in the front thereof with a spare tire compartment 12 defined by upper and lower walls 14, 16 respectively, a pair of transversely spaced lateral walls 18, and an inner side wall 20, as is best shown in Figures 2 and 4.

The compartment 12 has an open side 22 at the front of the vehicle body 10, and a closure for this open side is afforded by a cover 24 which is hinged to the body as at 26 and, when in its closed position, affords a front bumper for the vehicle, substantially as shown.

The door or cover 24 is sustained in its closed position by suitable screws or fasteners 28 extending through lugs 30 in the door opening of the compartment, and one of the features of the invention resides in the formation of concave recesses 32, 34 in the cover 24 and the inner side wall 20 respectively, which recesses provide seats for diametrically opposite portions of a spare tire 36 positioned in the compartment 12, so that any shifting or displacement of the tire is impossible.

The invention also contemplates the provision of a plurality of tire engaging rollers, namely, two sets of three rollers 38 which are rotatably mounted in suitable brackets 40 on the top wall 14 of the compartment 12, two sets of three rollers 42 which are similarly mounted in brackets 44 on the bottom wall 16, and an additional, relatively long roller 46 which is rotatably mounted in brackets 48 on the bottom wall 16, as shown.

The rollers 38, 42 engage the respective upper and lower surfaces and transversely spaced points of the tire 36, while the roller 46 engages the underside of the tire at the front thereof, so that by virtue of the provision of the rollers, the tire may be quickly, easily and conveniently placed in or withdrawn from the compartment 12 after the cover 24 is swung downwardly to its open position.

Figure 5:
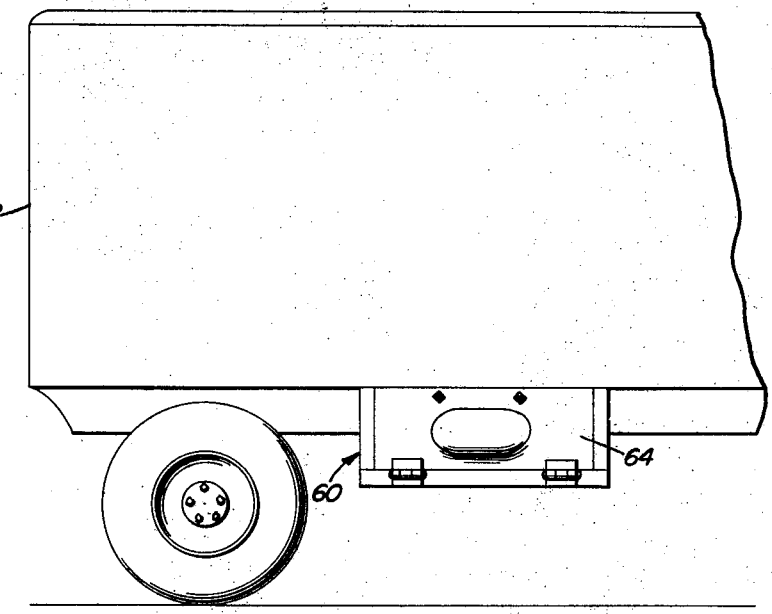
Figure 5 is a fragmentary side elevational view of the invention installed under a truck body, the cover of the compartment being closed.
Figure 6:
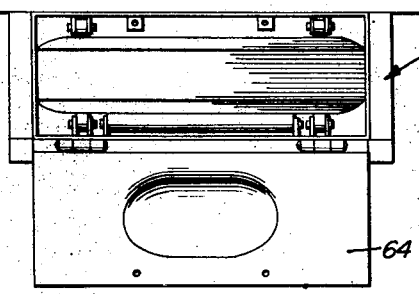
Figure 6 is a fragmentary side elevational view, similar to that shown in Figure 5, but illustrating the cover in its open position.

Referring now to the modified embodiment of the invention illustrated in the accompanying Figures 5 and 6, the spare tire compartment 60 herein is similar in construction to the compartment already described, but is mounted at one side of and under the body 62 of a vehicle such as a truck or trailer, the compartment 60 and the tire carrying rollers therein being similar in arrangement to the corresponding structure already described, with the exception that the door 64 of the compartment 60 functions merely as a door or closure for the compartment and does not have the auxiliary use as a bumper.

It is believed that the advantages and use of the invention will be clearly understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a vehicle body, a compartment adapted to receive a spare tire in a flat lying position and including vertically spaced upper and lower walls and a pair of side walls spaced apart substantially by a distance equal to the diameter of the stated tire, a back wall and a front door provided with concave seats to receive diametrically opposite edge portions of the tire, two transversely spaced sets of rollers mounted on the lower wall of said compartment substantially midway between the back wall and said door, two transversely spaced sets of rollers mounted on the upper wall of the compartment in vertical alignment with the first mentioned rollers, and an elongated roller mounted transversely on said lower wall adjacent said door, said elongated roller being centrally between but forwardly of the two sets of rollers on the lower wall.

ORVILLE O. PERKINS.

REFERENCES CITED

The following references are of record in the file of this patent:

UNITED STATES PATENTS

| Number | Name | Date |
|---|---|---|
| 353,640 | Nourse | Nov. 30, 1886 |
| 1,603,095 | Palmer | Oct. 12, 1926 |
| 1,953,953 | Carr | Apr. 10, 1934 |
| 2,175,769 | Biszantz | Oct. 10, 1939 |
| 2,226,962 | Baird | Dec. 31, 1940 |